(12) United States Patent
Edelson

(10) Patent No.: US 7,928,683 B2
(45) Date of Patent: Apr. 19, 2011

(54) HIGH PHASE ORDER AC MACHINE WITH SHORT PITCH WINDING

(75) Inventor: Jonathan Sidney Edelson, Portland, OR (US)

(73) Assignee: Borealis Technical Limited (GI)

( * ) Notice: Subject to any disclaimer, the term of this patent is extended or adjusted under 35 U.S.C. 154(b) by 1155 days.

(21) Appl. No.: 11/630,293

(22) PCT Filed: Jun. 21, 2005

(86) PCT No.: PCT/US2005/022011
§ 371 (c)(1),
(2), (4) Date: Dec. 19, 2006

(87) PCT Pub. No.: WO2006/002207
PCT Pub. Date: Jan. 5, 2006

(65) Prior Publication Data
US 2010/0219788 A1 Sep. 2, 2010

Related U.S. Application Data

(60) Continuation-in-part of application No. 11/029,978, filed on Jan. 4, 2005, now Pat. No. 7,116,019, which is a division of application No. 10/132,936, filed on Apr. 26, 2002, now Pat. No. 6,838,791, which is a continuation-in-part of application No. 09/713,654, filed on Nov. 15, 2000, now Pat. No. 6,657,334.

(60) Provisional application No. 60/581,789, filed on Jun. 21, 2004, provisional application No. 60/286,862, filed on Apr. 26, 2001.

(51) Int. Cl.
*G05D 23/275* (2006.01)

(52) U.S. Cl. .................................. 318/632; 318/432
(58) Field of Classification Search .................. 318/632, 318/461, 432, 727, 801
See application file for complete search history.

(56) References Cited

U.S. PATENT DOCUMENTS

| | | | |
|---|---|---|---|
| 382,279 A | 5/1888 | Tesla | |
| 3,808,481 A | 4/1974 | Rippel | |
| 3,821,619 A | 6/1974 | Hoffman | |
| 3,930,190 A | 12/1975 | Liska | |
| 3,931,553 A | 1/1976 | Stich et al. | |
| 4,161,680 A * | 7/1979 | Akamatsu | 318/722 |
| 4,292,575 A | 9/1981 | Kuhnlein et al. | |
| 4,484,115 A | 11/1984 | Takahashi | |
| 4,607,204 A | 8/1986 | Setoya | |
| 4,611,157 A | 9/1986 | Miller et al. | |
| 4,713,594 A | 12/1987 | Bose et al. | |
| 4,730,150 A | 3/1988 | Lee et al. | |
| 4,736,147 A | 4/1988 | Shizang | |

(Continued)

FOREIGN PATENT DOCUMENTS

DE  20/03639  8/1971

(Continued)

*Primary Examiner* — Rina I Duda

(57) ABSTRACT

A high phase order alternating current rotating machine is disclosed having an inverter drive that provides more than three phases of drive waveform of harmonic order H, and characterized in that the windings of the machine have a pitch of less than 180 rotational degrees. Preferably the windings are connected together in a mesh, star or delta connection. A method for operating a high phase order induction motor is also disclosed, involving electrically connecting N windings into a mesh connection with a value of Δ that provides a substantial range in speed/torque relation when operating with at least two out of first, second and third harmonic, low order harmonics being the most efficient.

26 Claims, 8 Drawing Sheets

U.S. PATENT DOCUMENTS

| | | | |
|---|---|---|---|
| 4,743,828 A * | 5/1988 | Jahns et al. | 318/810 |
| 4,751,448 A | 6/1988 | Auinger | |
| 4,755,732 A | 7/1988 | Ando | |
| 4,900,965 A | 2/1990 | Fisher | |
| 4,912,379 A * | 3/1990 | Matsuda et al. | 318/400.23 |
| 4,947,072 A * | 8/1990 | Watkins et al. | 310/179 |
| 4,959,577 A * | 9/1990 | Radomski | 310/263 |
| 5,053,689 A * | 10/1991 | Woodson et al. | 318/705 |
| 5,068,587 A | 11/1991 | Nakamura et al. | |
| 5,075,610 A | 12/1991 | Harris | |
| 5,449,962 A | 9/1995 | Shichijyo et al. | |
| 5,488,280 A | 1/1996 | Langreck | |
| 5,614,799 A | 3/1997 | Anderson et al. | |
| 5,686,770 A | 11/1997 | Naito | |
| 5,703,457 A | 12/1997 | Davis | |
| 5,977,679 A | 11/1999 | Miller et al. | |
| 5,994,802 A * | 11/1999 | Shichijyo et al. | 310/51 |
| 6,054,837 A * | 4/2000 | Edelson | 318/801 |
| 6,064,172 A | 5/2000 | Kuznetsov | |
| 6,101,109 A | 8/2000 | Duba et al. | |
| 6,153,953 A | 11/2000 | Isozaki et al. | |
| 6,175,272 B1 | 1/2001 | Takita | |
| 6,326,713 B1 * | 12/2001 | Judson | 310/112 |
| 6,373,160 B1 | 4/2002 | Schrodl | |
| 6,426,605 B1 * | 7/2002 | Toliyat et al. | 318/801 |
| 6,657,334 B1 | 12/2003 | Edelson | |
| 6,768,279 B1 | 7/2004 | Skinner et al. | |
| 6,812,661 B2 | 11/2004 | Maslov | |
| 6,831,430 B2 | 12/2004 | Edelson | |
| 6,838,791 B2 | 1/2005 | Edelson | |
| 6,892,439 B1 | 5/2005 | Neal et al. | |
| 6,922,037 B2 | 7/2005 | Edelson | |
| 7,116,019 B2 | 10/2006 | Edelson | |
| 2002/0041168 A1 | 4/2002 | Mann et al. | |

FOREIGN PATENT DOCUMENTS

| | | |
|---|---|---|
| WO | WO 00/51229 | 8/2000 |
| WO | WO-2006/002207 A2 | 1/2006 |
| WO | WO-2006/065988 A2 | 6/2006 |

* cited by examiner

Figure 3a (Prior Art)
Figure 3b (Prior Art)
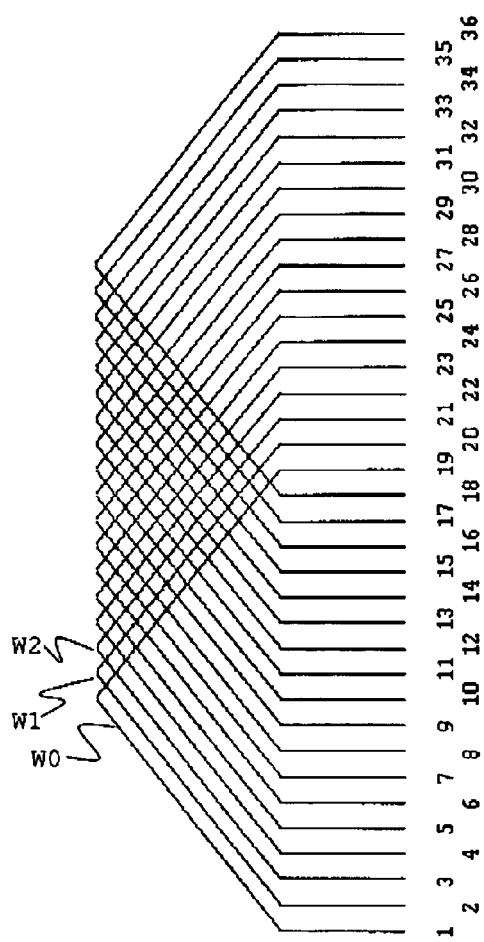
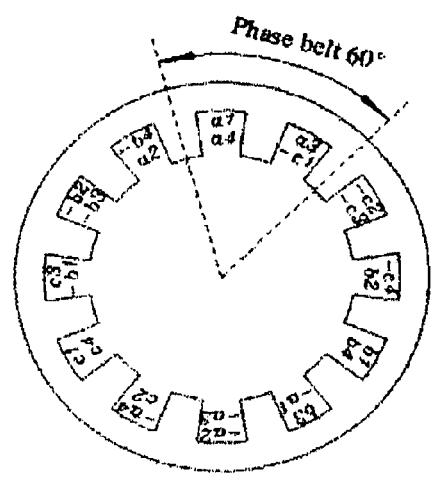

Figure 5b
Figure 5c
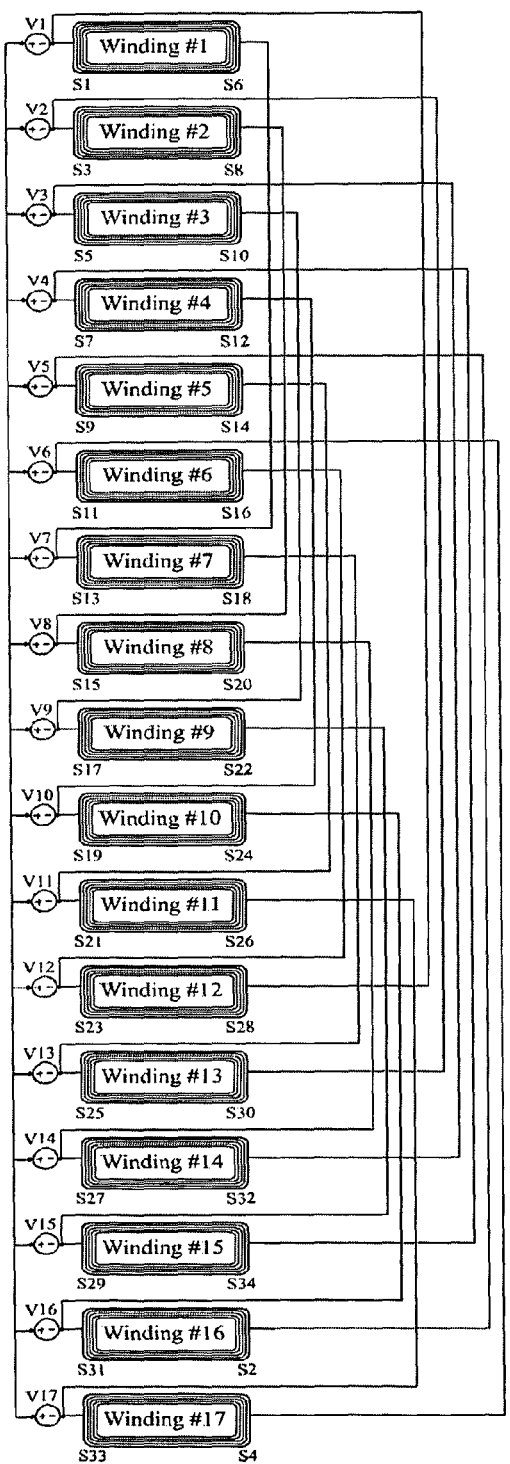
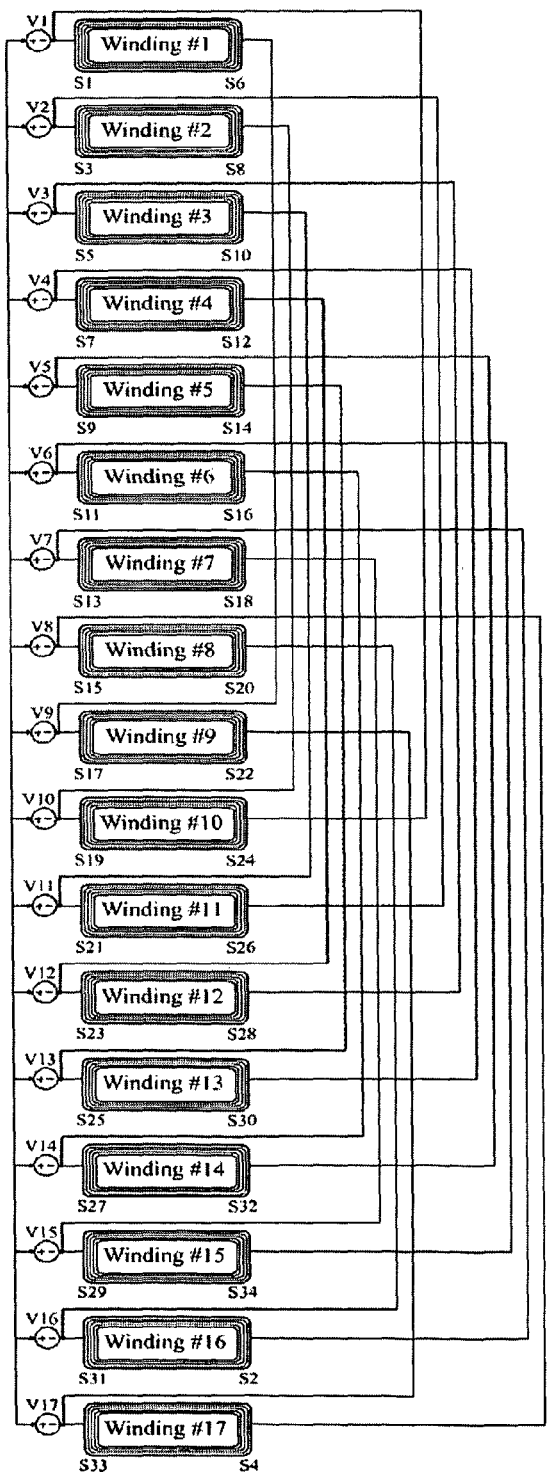

HIGH PHASE ORDER AC MACHINE WITH SHORT PITCH WINDING

CROSS-REFERENCE TO RELATED APPLICATIONS

This application is the U.S. national stage application of International Application No. PCT/US2005/022011, filed Jun. 21, 2005, which international application was published on Jan. 5, 2006, as International Publication WO2006/002207 in the English language. The International Application claims the benefit of Provisional Patent Application No. 60/581,789, filed Jun. 21, 2004 and is a Continuation-in-part of U.S. patent application Ser. No. 11/029,978, filed Jan. 4, 2005 now U.S. Pat. No. 7,116,019, which is a Divisional of U.S. patent application Ser. No. 10/132,936 filed Apr. 26, 2002 now U.S. Pat. No. 6,838,791, and which claims the benefit of U.S. Provisional App. No. 60/286,862 filed Apr. 26, 2001. U.S. patent application Ser. No. 10/132,936 is a Continuation-in-part of U.S. patent application Ser. No. 09/713,654, filed Nov. 15, 2000 now U.S. Pat. No. 6,657,334.

TECHNICAL FIELD

The present invention relates to alternating current rotating machines, particularly motors and generators, and their inverter drives.

BACKGROUND ART

Alternating current induction motors have been developed as suitable power driving sources. Polyphase motors, including three phase motors, are widely applied in industrial and similar heavy duty applications. A rotor is rotatably mounted within an annular stator. The stator is wound with N distinct phase windings, connected to an N phase alternating current power supply, where N is an integer greater than two. The rotor is normally provided with a short circuited winding which responds to the stator field to create an induced field. An N phase power supply has phase voltages and currents which are offset from each other by 360/N electrical degrees. The N phase winding thereby develops a magnetic field which moves circumferentially about the stator and rotor. The induced field tends to align with and follow the rotating field to create a rotating force and motion of the rotor as a result of the electromagnetic coupling between the fields of the stator and the rotor.

An alternating current motor is commonly driven by an inverter. An inverter is a device capable of supplying alternating current of variable voltage and variable frequency to the alternating current motor, allowing for control of machine synchronous speed and thus of machine speed. The inverter may also be used with alternating current generators, and can cause an alternating current motor to act as a generator for braking applications. An alternating current motor may be an induction motor, a synchronous motor with either a wound rotor or permanent magnet rotor, or a brushless DC motor.

In many cases, the cost of the inverter is considerably greater than the cost of the motor being supplied. It is thus necessary to minimize the size of the inverter power electronics in order to control system cost.

Whereas the alternating current machine itself may have substantial overload capability, and may carry currents of the order of five to ten times full rated current for periods measured in minutes, the overload capability of the inverter electronics is severely limited. Exceeding the voltage or current ratings of the inverter electronics will swiftly cause device failure.

Commonly, inverter electronics is specified such that it can tolerate 150% of nominal full load current for 1 minute, and for any given motor, and inverter will be selected which has the same nominal current capability as that of the motor.

Voltage is set internally by the inverter system or by the rectified supply voltage. Voltage overload is normally not specified, and will cause near instantaneous destruction of semiconductor elements. The voltage ratings of the semiconductors instead set the maximum output voltage of the inverter system, and an inverter will be selected which has a maximum output voltage that matches the operating voltage of the motor at full speed.

With any reasonably sized inverter, substantial motor overload capabilities remain untapped.

Electrical rotating machinery presents impedance that changes with mechanical load and rotational velocity. As the speed of the electrical rotating machine is increased, the voltage produced by a generator, or the voltage required by a motor will tend to increase proportionally. For example, in an induction motor, in order to maintain a constant magnetic field strength as the applied frequency is changed, a constant ratio of applied voltage to frequency is maintained. For permanent magnet machines, the back-emf produced by the motor will increase as rotor speed increases, again requiring increased voltage in order to drive the machine. U.S. Pat. No. 6,812,661 to Maslov discloses changing motor topology on a dynamic basis to obtain maximum efficiency for each of a plurality of operating speed ranges. A plurality of mutually exclusive speed ranges between startup and a maximum speed at which a motor can be expected to operate are identified and a different number of the motor stator winding coils that are to be energized are designated for each speed range. The number of energized coils is changed dynamically when the speed crosses a threshold between adjacent speed ranges. Even direct current machines (not covered by the present invention) require increased voltage as speed is increased, if magnetic field strength is maintained as a constant.

In general, the required voltage is expressed in terms of Volts/Hertz.

In many traction application, there is limited available electrical power. Thus requirements for high overload capability can only be met at low speed, where high torque is required for starting, but reduced speed means that mechanical power output is still low. Such low speed torque requirements require high current to flow though the motor, but do not require high operating voltage. It is thus possible to trade high speed operating capability for low speed overload capability at the design stage of a motor drive system.

By increasing the number of series turns in the motor windings, higher slot current may be achieved with the same terminal current, thus permitting the same inverter to provide greater overload current to the motor. This increase in overload capability comes at a substantial cost. The increased number of series turns means that the motor operating voltage is increased, operation at high speed is prevented. Most motors are designed for dual voltage operation, through the expedient of operating various subcircuits of the motor in series or parallel connection. The change between series and parallel connection may be accomplished though suitable contactor arrangements, permitting the motor to be operated with a higher number of series turns at low speed, and a lower number of series turns at high speed. For a simple three phase alternating current machine system, such a system would require at least two single-pole three-phase contactors, and would only offer a factor of 1.7 increase in low speed overload capability. With three contactors, a factor of two change is possible.

The change in series turns may be considered a change in alternating current machine impedance, or current versus voltage relation. Normally, an alternating current machine will have a fixed relationship between synchronous speed and impedance, characterized by the Volts/Hertz ratio. For a given inverter and machine frame, a machine wound with a higher Volts/Hertz ratio will have a lower maximum speed, but higher peak low speed torque.

It is thus necessary to provide for an alternating current machine drive system in which the alternating current machine presents a variable Volts/Hertz ratio to the inverter. For high speed operation, the Volts/Hertz ratio would be adjusted to a low value, in order to maintain a suitable alternating current machine operational voltage. For low speed operation, the Volts/Hertz ratio would be adjusted to a higher value, so as to permit high overload torque operation.

In this disclosure, the following abbreviations are used:
RD: rotational degrees on the stator
ED: electrical degrees
H: harmonic order
P: pitch factor
B: base number of magnetic poles developed by a machine driven by fundamental frequency, H=1.
Kc: chording factor
N: number of different driven electrical phases in a machine
F: phase angle of any given winding phase
Δ: phase angle difference of the inverter output terminals driving the windings
L: spanning value of mesh connection
V: volts
Vw: Voltage across a winding
Vout: output to neutral voltage of the inverter
W: Winding phase number
S: Slot number
T: Turn count The term 'winding' herein refers to the group of all of the windings and/or coils and/or conductors of a single phase, unless otherwise specified. The winding that constitutes each phase consists of a 'supply half' and a 'back half'. The 'supply half' is driven by the power supply, and has a phase angle dependent on the power supply phase or phases to which it is connected. The phase angle of the back half of each phase is equal to the phase angle of the supply half, offset by 180 ED. The windings are wound of copper or other low resistance wire or other conductors.

The following equations are also used:

$$F = 360 * H * W/N \quad \text{(i)}$$

$$Vw = 2 * \sin((B*H*\Delta)/4) * Vout \quad \text{(ii)}$$

$$P = (\text{winding pitch in RD}) * H * B / 360 \quad \text{(iii)}$$

$$Kc = \sin(90 * P) \quad \text{(iv)}$$

A mesh connection is disclosed in my previous abovementioned patents and applications. Each of N windings is connected between two of N inverter outputs. A first terminal of each winding phase is connected in phase angle order to one of the N inverter outputs. A phase angle difference is produced by connecting the second terminal of each winding to a second inverter phase. Δ represents the phase angle difference between the inverter output phases across the two terminals of each winding. All of the windings in a machine have the same value of Δ. Δ is measured according to H=1 and is irrespective of the harmonic order of the drive waveform. A low Δ is produced by connecting the first terminal of a winding to a first inverter phase, and the second terminal of the winding to the next inverter phase. For example, in a 9 phase machine, Δ may be 40, 80, 120 and 160 ED.

DISCLOSURE OF INVENTION

From the foregoing it will be appreciated that a need as arisen for electrical rotating apparatus that has variable impedance, and which is tolerant of even order harmonics, such as H=2 or H=4. Even order values harmonics are valuable since the lower harmonic used, the greater the magnetic pole area, and the more power may be produced. A choice of harmonic drives with a mesh connected machine provides a variable V/Hertz ratio.

The present invention is directed to a high phase order alternating current rotating machine having an inverter drive that provides more than three phases of drive waveform of harmonic order H, and characterized in that the windings of the machine have a pitch of less than 180 rotational degrees In a preferred embodiment, the invention is a high phase order alternating current machine comprising N windings connected together in a mesh connection, driven by N phases of electrical power, where N is greater than three. In other embodiments, the windings are connected in a star or delta connection. In further embodiments the a star-connected machine has an inverter that provides a drive waveform comprising a selectable degree of H=1 and another harmonic closest to 180/(Pitch in RD).

The present invention is a high phase order induction machine with short pitch windings. According to the pitch, a plurality of both odd and even order harmonics may be used to drive the machine. Each harmonic may provide a different Vw, a different V/Hertz ratio, and a different chording factor. Thus in a mesh connected machine, both Vw and Kc affect the V/Hertz machine ratio controlling the torque output of the machine, the Vw determines the V/Hertz ratio of the windings, and the Kc determines the effective turn count of the winding.

The present invention teaches a method for operating a high phase order induction motor involving electrically connecting N windings into a mesh connection with a value of Δ that provides a substantial range in speed/torque relation when operating with at least two out of first, second and third harmonic, low order harmonics being the most efficient. The pitch factor is chosen to yield a value for Kc optimized for each of the low order harmonics used, so that the Kc is reasonably close to unity and preferably helps produce the required range of speed/torque. To operate the machine, a user or control unit selects between individual or combination harmonics to control the machine speed/torque relation and output. Δ may also be variable; if it is, the Kc is chosen at the design stage to meet an application's requirements for the usable values of Δ, with low order harmonics.

The present invention is further directed to selection of a winding pitch that yields a different value for Kc for different harmonics. The aim is to select a Kc that is optimal for the desired harmonics.

The turn count, wire thickness, slot size, slot count and winding distribution, etc are all factors that may further affect the V/Hertz ratio. These are also optimized to provide the desired range in ratios. The machine is wound accordingly.

The invention further defines the following variable factors that may be used in combination to meet an application's requirements.
1) The number of different phases, N.
2) The harmonic order, H. H must be less than N to properly develop B*H magnetic poles. In a mesh connected machine, H will affect both Vw and Kc. In addition, the lower H is, the larger is the pole area it may develop, meaning that a lower order harmonic is more powerful.

3) The winding pitch, P. The pitch must allow each useful harmonic to develop magnetic poles. The pitch provides a different Kc ratio per allowed harmonic.

4) In a mesh connected machine, the phase angle difference between inverter phases across each winding, Δ, produces a different Vw per allowed harmonic. Δ may be mechanically variable. The range of possible values of Δ are the integers up to N/2, multiplied by 360/N.

5) The coil turn count, the wire diameter, the winding distribution factor, slot size, as well as various other factors well known in the art also affect the V/Hertz ratio.

For each application, a set of V/Hertz ratios required is determined. Values of N, H, P, Δ, and other factors are selected to produce the required ratios.

A technical advantage of the present invention is that high torque overload may be provided at low speeds whilst sufficient voltage is also provided for high-speed applications.

A further technical advantage of the present invention is that varying the phase angle difference across each motor phase by changing the harmonic applied by the inverter to the mesh connection, provides a change in Volts/Hz ratio through a logical change of the output synthesized by the inverter. This means that the motor may have a fixed electrical connection to the inverter. A yet further technical advantage is that the change in harmonic content may be obtained in a smooth fashion, successively passing through various admixtures of harmonic components.

A further technical advantage of the present invention is that by changing the spanning value L, the same machine pole count is maintained.

BRIEF DESCRIPTION OF DRAWINGS

For a more complete explanation of the present invention and the technical advantages thereof, reference is now made to the following description and the accompanying drawings, in which:

FIG. 3a (prior art) is a winding schematic of an 18 phase, 36 slot machine;

FIG. 3b (prior art) is a schematic of a distributed and short pitch winding in a two pole induction motor;

FIG. 5b is a combination circuit and physical diagram for a 34 slot machine having 17 phases driven in a mesh connection, in which L=6;

FIG. 5c is a combination circuit and physical diagram for a 34 slot machine having 17 phases driven in a mesh connection, in which L=8;

BEST MODE FOR CARRYING OUT THE INVENTION

Figure 1:
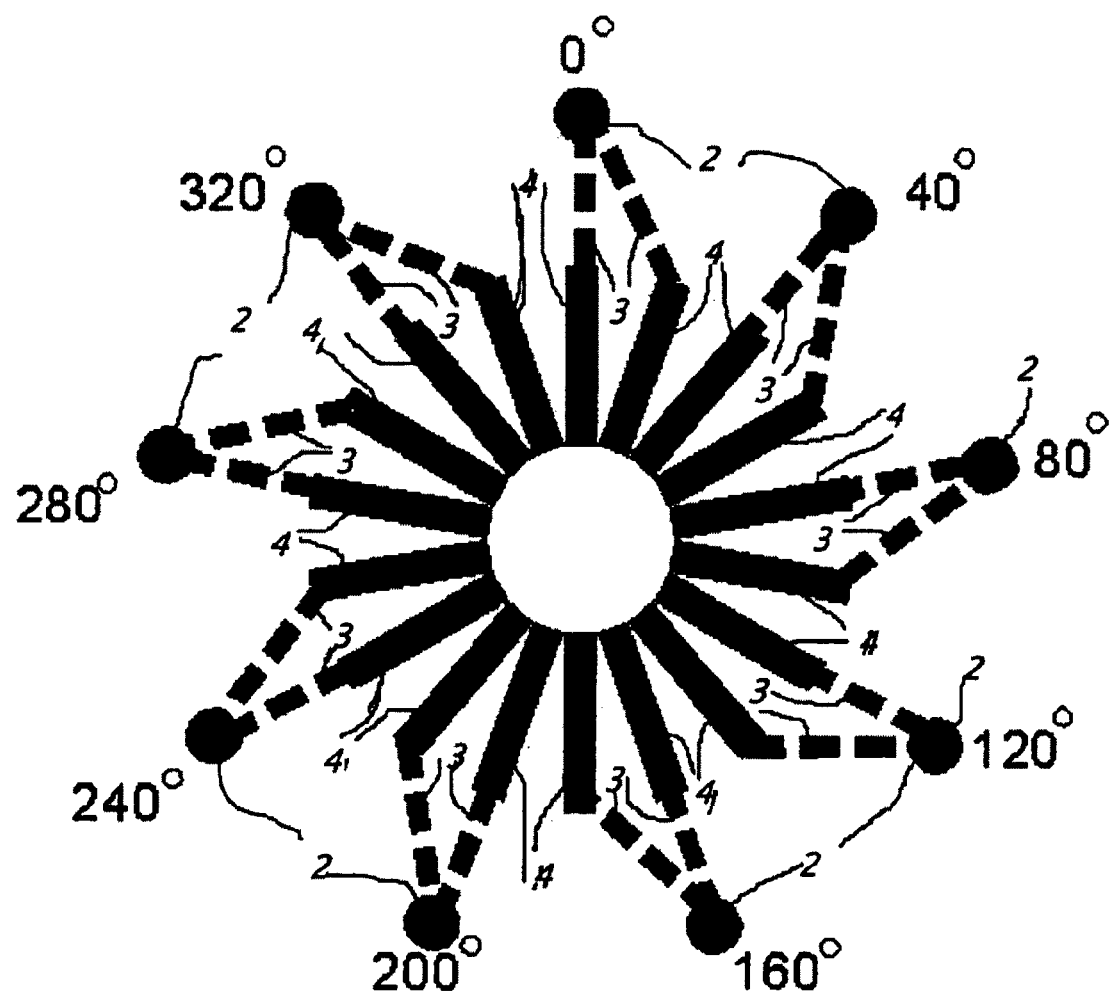
FIG. 1 is a diagrammatic representation of a motor stator and windings.

An alternating current machine is commonly driven by an inverter. An inverter is a device capable of supplying alternating current of variable voltage and variable frequency to the alternating current machine, allowing for control of machine synchronous speed and thus of machine speed. The inverter may also be used with alternating current generators, and can cause an alternating current motor to act as a generator for braking applications. An alternating current motor may be an induction motor, a synchronous motor with either a wound rotor or permanent magnet rotor, or a brushless DC motor.

A preferred embodiment of the present invention is a high phase order machine in which each phase terminal is separately connected to an inverter output. The windings of the induction machine are wound with the motor terminals connected in a mesh connection to produce a low impedance output. The inverter is capable of operating with a variable phase sequence that changes the effective impedance of the motor.

In a mesh connected machine, the voltage applied to a given winding, which is measured from one terminal of the winding to another, will in general be different from the supply voltage fed to the machine. The reason for this is that the supply will be from a machine of different connection, and thus the relevant voltage measurements will give different results. Specific identified phase-to-phase voltages will always be the same for two connected high phase order machines, however the voltage placed across a winding or switching element will likely be different.

The following equations relate the voltage placed across the windings of a mesh connected machine to the voltages applied to the machine terminals as measured between the terminal and neutral. These are the equations which relate the output voltages of a star connected supply to the winding voltages of a mesh connected motor, and can be inverted to relate a mesh connected supply to a star connected motor. The equations could be used twice to describe a mesh connected supply connected to a mesh connected motor.

$$V_K = V_{MAX} \text{Re}\{e^{ih(\omega t + \frac{2K}{m}\pi)}\} \qquad (1)$$

Equation 1 describes the line to neutral voltage of the supply, where m is the number of phases in a balanced supply, K is the particular phase of interest, and may range from 0 to m−1, ω is the frequency of the alternating current in radians per unit time, t is time, h is the harmonic order being generated, and $V_{MAX}$ is the peak voltage of the output waveform. The equation is written using standard complex exponentiation form, in which the constant e is raised to a complex number. In this case, the exponent is a purely imaginary value, thus the result of the exponentiation has constant periodicity over time. Only the real portion of this periodic function is used.

The terms in the exponent include a function of time, which results in the periodic nature of the voltage with time, and a constant rotation term, which results in the phase difference between the various phases.

Rearranging Equation 1, clearly separating the constant and periodic terms, gives:

$$V_K = \text{Re}(V_{MAX} e^{ih\omega t} e^{i\frac{2hK}{m}\pi}) \qquad (2)$$

It is clearly seen that each phase differs from the other phases only by the constant rotation term, and that the periodic term does not depend in any way upon the particular phase.

The voltage across the particular winding K as a function of the voltage applied to its two ends is given by Equation 3.

$$VW_K = V_K - V_{(K+L)\% m} \quad (3)$$

The voltages applied to winding K are simply that of phase K and phase K+L, where L is the spanning value for the particular mesh connection, which represents the number of inverter output phases between the first and second terminal of each single phase winding. The greater the spanning value, the greater the voltage placed upon a winding for a given inverter output voltage. Expanding Equation 3 using the terms in Equation 2 gives:

$$= \text{Re}\left(V_{MAX} e^{ih\omega t} e^{i\frac{2hK}{m}\pi}\right) - \text{Re}\left(V_{MAX} e^{ih\omega t} e^{i\frac{2h(K+L)}{m}\pi}\right) \quad (4)$$

Equation 4 may be rearranged as follows:

$$= \text{Re}\left(V_{MAX} e^{ih\omega t} \left(e^{i\frac{2hK}{m}\pi} - e^{i\frac{2h(K+L)}{m}\pi}\right)\right) \quad (5)$$

$$= \text{Re}\left(V_{MAX} e^{ih\omega t} \left(e^{i\frac{2hK}{m}\pi} - e^{i\frac{2hK}{m}\pi} e^{i\frac{2hL}{m}\pi}\right)\right) \quad (6)$$

$$= \text{Re}\left(V_{MAX} \left(1 - e^{i\frac{2hL}{m}\pi}\right) e^{ih\omega t} e^{i\frac{2hK}{m}\pi}\right) \quad (7)$$

Equation 7 is the desired result, separating the exponential term into constant and periodic portions of the various variables. Of particular interest is that the term $V_{MAX}$, the periodic term, and the constant rotation term all remain as in the original equation, but an additional term is added. This term depends upon the applied harmonic h, the spanning value L, the number of phases m, but is independent of the particular phase K and is also independent of frequency ω or time t.

Equation 7 shows that the voltage applied to a winding depends upon the voltage output of the supply, but it also depends upon the harmonic order h and the spanning value L. By changing the spanning value, as for example by connecting the machine using a different mesh connection, the voltage applied to the winding will change even if the voltage output of the supply remains constant.

These equations demonstrate that for a given machine, the Volts/Hz ratio of the machine may be changed by altering either the harmonic applied by the inverter to the mesh connection, or by altering the spanning value L of the mesh connection between the inverter and the rotating machine.

The advantage of changing the harmonic applied by the inverter to the mesh connection is that the change in Volts/Hz ratio may be obtained through a logical change of the output synthesized by the inverter. This means that the motor may have a fixed electrical connection to the inverter. This technique is disclosed in my co-pending application Ser. No. 09/713,654, filed Nov. 15, 2000, entitled "High Phase Order Induction Machine with Mesh Connection", now U.S. Pat. No. 6,657,334.

Furthermore, the change in harmonic content may be obtained in a smooth fashion, successively passing through various admixtures of harmonic components. Thus there is no sudden discontinuity in drive when switching between harmonic operating states. Disadvantages of this technique are that it requires a machine capable of operation with harmonic drive; e.g. a pole count changing alternating current machine, or a synchronous machine with variable pole count rotor, or a permanent magnet machine with a rotor which reacts both to the fundamental and the harmonic components of the drive waveform. An additional disadvantage with a pole count changing alternating current machine is that the basic efficiency of such a machine will go down as the pole area is reduced. However the elimination of mechanical contactors is a benefit.

The advantage of changing the spanning value L is that the same machine pole count is maintained. Thus methods that change the spanning value L are applicable to machines with fixed pole counts. This includes some wound rotor alternating current machines, as well as most synchronous machines, permanent magnet machines, and brushless DC machines. Furthermore, for alternating current machine operation, pole area is maintained, which increases machine efficiency. Finally, changing the spanning value L generally permits a greater number of possible Volts/Hz ratios to be obtained from the same machine. Disadvantages of changing the spanning value L are that a mechanical contactor arrangement must be used to physically change the electrical connectivity of the mesh connection, and that power to the motor must be interrupted in order to change the mesh connection.

Figure 2A:
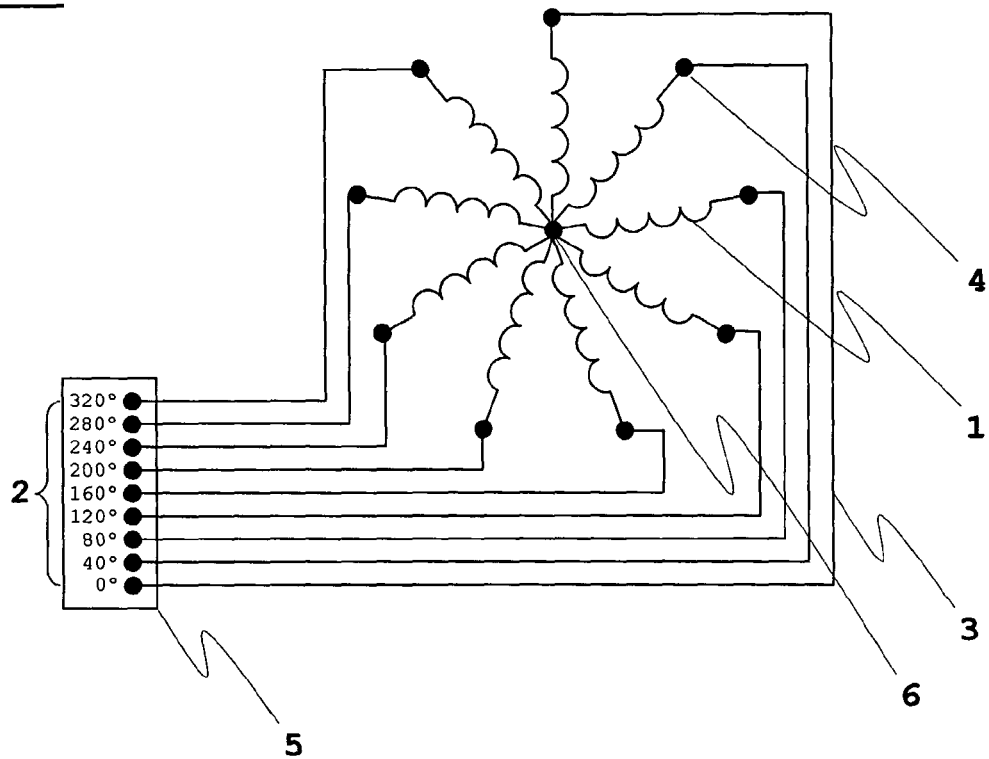
FIG. 2 is a diagrammatic representation of connections possible with a 9-phase polyphase device.
Figure 2B:
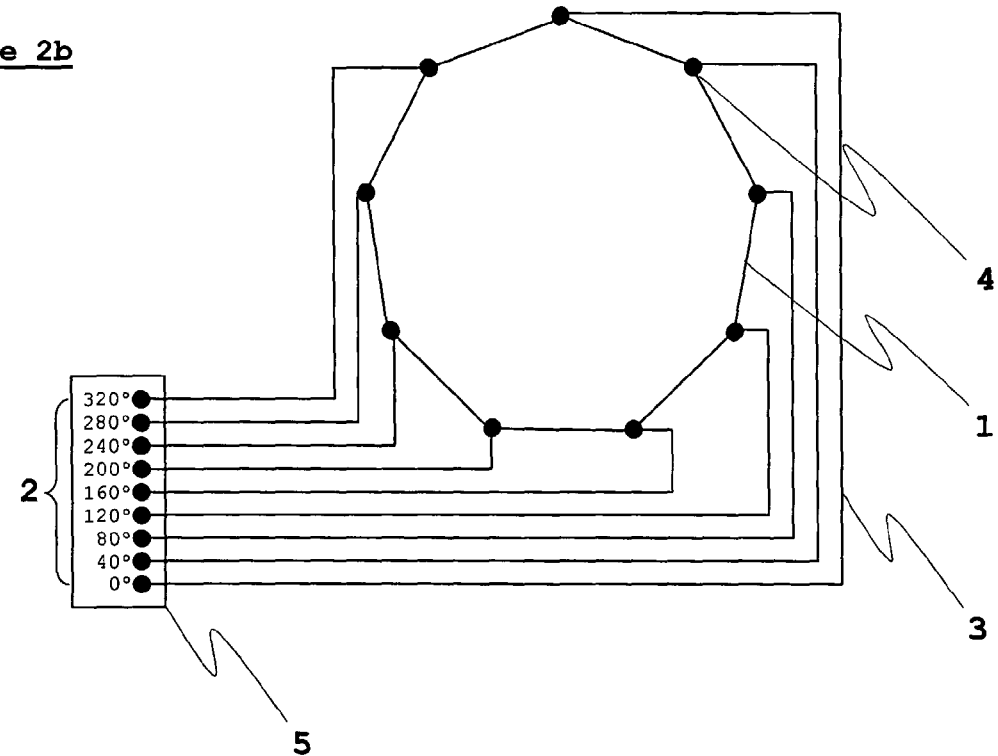
Figure 2C:
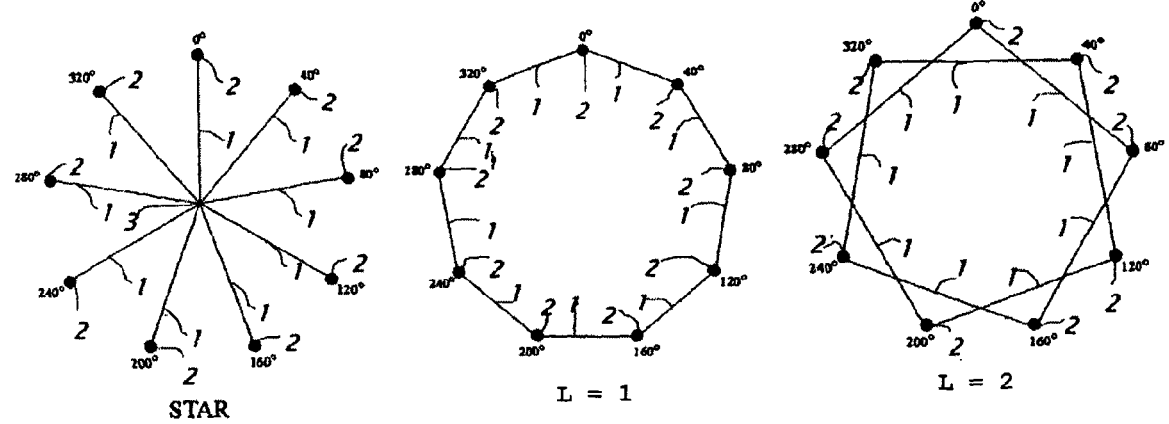
Figure 2C:
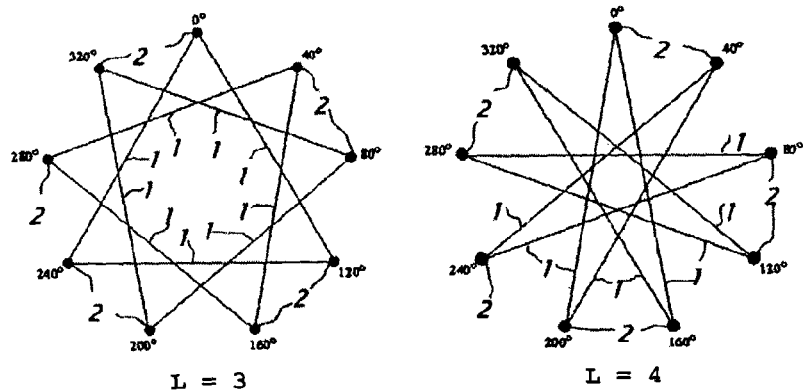

In a rotating electrical machine, each phase winding set can be described by two terminals. There may be a larger number of terminals, but these are always grouped in series or parallel groups, and the entire set can be characterized by two terminals. In a star connected machine, one of these terminals is driven by the inverter or power supply, while the other terminal is connected to the machine neutral point. All current flows through one terminal, through the neutral point into other windings, and though the driven terminals of the other phases. In a mesh-connected machine, these two terminals are connected directly to two different supply points. An example of how this may be done is shown in FIG. 1, in which the stator slots 4 are shown as straight lines running down the inside of the stator, and inverter terminals 2, are shown as circles, alongside which is marked phase angles of each of the inverter terminals. Electrical connections 3 between the winding terminals in stator slots 4 and inverter terminals 2 are represented by dashed lines. Two winding halves are displayed opposite one another, and are actually joined to one another, although this is not shown. The configuration describes a 9 phase machine connected with an L=4 connection, as shown in FIG. 2c.

In contrast to three phase systems, in which there are only three inverter terminals and six motor windings terminals, in a high phase count system with N phases, there are N inverter terminals and 2N motor windings terminals. There are thus a substantial number of choices for how an N phase system may be mesh connected. This set of choices is greatly reduced by rotational symmetry requirements, specifically each winding must be connected to two inverter terminals with the same electrical angle difference between them as for every other winding.

A simple graphical schematic of the permissible inverter to motor windings connections may thus be described for a polyphase motor having N phases. In the following embodiment, N is equal to 9, but it is to be understood that this limitation is made to better illustrate the invention; other values for N are also considered to be within the scope of the present invention. FIG. 2a shows 9 evenly spaced terminals 4 and a center terminal 6. Each of the terminals 4 represent one end of a motor winding 1 and the center terminal 6 represents the other end of the motor winding. An inverter 5 has 9 terminals 2, which are connected to one of the terminals 4 of each of the motor windings 1 via electrical connectors 3 as shown.

Permissible connections of the 9 phase windings are either from the center point, to each of the 9 points on the circle (this being the star connection shown as FIG. 2a) or from each of the 9 points to another point. This latter is shown in FIG. 2c; in FIG. 2b motor winding 1 is represented by a line, and in FIG. 2c inverter 5 and electrical connectors 3 have been omitted for the sake of clarity. It will be noted that for each L from 1 to 4 there is a corresponding L from 5 to 8 that produces a mirror image connection.

FIG. 2c shows all permissible connections for a 9 phase system from L=1 to L=4 as well as the star connection. Noted on the star connection diagram are the relative phase angles of the inverter phases driving each terminal. For a given inverter output voltage, measured between an output terminal and the neutral point, each of these possible connections will place a different voltage on the connected windings. For the star connection, the voltage across the connected windings is exactly equal to the inverter output voltage. However, for each of the other connections, the voltage across a winding is given by the vector difference in voltage of the two inverter output terminals to which the winding is connected. When this phase difference is large, then the voltage across the winding will be large, and when this phase difference is small, then the voltage across the winding will be small. It should be noted that the inverter output voltage stays exactly the same in all these cases, just that the voltage difference across a given winding will change with different connection spans. The equation for the voltage across a winding is given by:

$$2\sin\left(\frac{\Delta}{2}\right)V_{out}$$

where $\Delta$ is the phase angle difference of the inverter output terminals driving the winding, and $V_{out}$ is the output to neutral voltage of the inverter.

Thus, referring to FIG. 2, when L=1, the phase angle difference is 40 degrees, and the voltage across a winding is 0.684 Vout. When L=2, the phase angle difference is 80 degrees, and the voltage across the winding is 1.29 Vout. When L=3, the phase angle difference is 120 degrees, and the voltage across the winding is 1.73 Vout. Finally, when L=4, the phase angle difference is 160 degrees, and the voltage across the winding is 1.97 Vout. For the same inverter output voltage, different connections place different voltage across the windings, and will cause different currents to flow in the windings. The different mesh connections cause the motor to present different impedance to the inverter. In other words, the different mesh connections allow the motor to use the power supplied by the inverter in different rations of voltage and current, some ratios being beneficial to maximize the torque output (at the expense of available speed), and some ratios to maximize the speed output (at the expense of maximum available torque).

As shown in FIG. 2, the inverter outputs may be represented as points on a unit circle, with the relative positions of the points representing the phase angle of this inverter output. The winding of the motor is composed of individual single phase windings, each of which as two terminals. The single phase windings are represented by line segments, and are the single phase sub-elements described above. The end points of these line segments represent the terminals of the windings. When one terminal of each winding is connected to the origin, and the other terminal is connected to an inverter output as represented by a point on the unit circle, then a star connection may be represented. When line segments are connected between points on the unit circle, then a mesh connection is represented. An M phase symmetrical mesh connection will be represented by a diagram which has M fold rotational symmetry.

Each of the mesh connections may be represented by the spanning value 'L', which represents the number of inverter output phases between the first and second terminal of each single phase winding. The greater the spanning value, the greater the voltage placed upon a winding for a given inverter output voltage. Changes in spanning value may be considered a rotation of the connection between second terminals of each single phase winding and the inverter output terminals.

In the foregoing and my previous patents, U.S. Pat. Nos. 6,657,334, 6,831,430, and 6,838,791, I disclosed details of high phase order induction machines. I focused particularly upon concentrated, full pitch windings, and the use of odd order harmonics. A benefit of these machines is that odd order harmonics with a harmonic number up to the phase count are marshaled to produce only beneficial torque. For the purpose of this disclosure as well as my previous disclosures, the term 'harmonic' was used to identify power supply phase angle relationships which were associated with the phase angles of harmonics in a fundamental drive frequency. The 'pure' harmonic is used as a new drive waveform, and results in a change in the number of magnetic poles developed by the motor. Harmonic drive may also be described as a multiplicative change in the power supply phase angles used to drive each winding. In this description, 'H' refers to the order of the harmonic drive. For example, H=1 refers to first harmonic drive, or fundamental drive waveform. H=2 refers to second harmonic drive, H=3 is third harmonic drive, etc. H=1 is not limited to any particular frequency, such as 50 Hz, and may instead be variable. However, in order to preserve clarity in the present disclosure, H=1 is mentioned as if it were a fixed frequency.

A machine is wound to give a base number of poles, B, which is the number of poles that are developed with fundamental harmonic drive (H=1). When a harmonic drive is used, the number of poles developed is equal to B*H, for example, if B=2, H=1 develops 2 poles, H=3 develops 6 poles, etc.

Full pitch windings (180 RD between supply and back windings) make most efficient use of the conductors in the slots. Concentrated windings permit maximum harmonics tolerance. Even order values of H are not useable with full pitch windings because of symmetry requirements. If even order values of H are applied to a full pitch winding, a 'magnetic short circuit' results, in which current flowing through the back half of the winding is in near opposition to the current in the supply half of the winding. The counter-flow currents cancel each other out, no magnetic field is produced, and machine inductance drops.

By way of example, a circuit diagram for a 36 slot, 36 phase, two pole, concentrated winding, full pitch machine is shown in FIG. 3a. Thirty-six numbered slots are provided, and the lines adjacent the slot number represent the winding in that slot. Eighteen bent lines are shown, each of which represents a driven winding phase. The windings are numbered W0-W17, only the first three of which are marked, for clarity. The bend in each winding renders the winding into two halves, a supply half and a back half. Depending on drive connection, either half may be the supply or back half. The back half always has a phase angle difference of 180 ED from the supply half. The phase angle of any given winding phase is given by equation (i), in which H is the order of harmonic drive, W is the winding phase number and N is the phase count.

Each winding has a pitch of 1:19, which represents a full pitch winding and the base number of poles, B, is 2. The slots containing the supply half and the back half of each phase are 180 RD apart from one another on the stator. The windings are concentrated, meaning that each half winding is not distributed over more than one slot. An N phase power supply supplies N voltages and currents to provide each winding with an electrical phase.

The high phase order machine may be provided with full bridge inverter drive, in which each winding is driven independently by two inverter half bridges. To reduce the number of inverter components by half, two approaches may be used.

A star connection is produced by driving one terminal of each phase winding together, while the second terminal of each winding are connected together and have a voltage of generally zero. The phase angle of each winding is equal to the phase angle of the inverter drive at the driven end of each winding.

A mesh connection is disclosed in my previous abovementioned patents and applications. Each of N windings is connected between two of N inverter outputs. A first terminal of each winding phase is connected in phase angle order to one of the N inverter outputs. A phase angle difference is produced by connecting the second terminal of each winding to a second inverter phase. $\Delta$ represents the phase angle difference between the inverter output phases across the two terminals of each winding. All of the windings in a machine have the same value of $\Delta$. $\Delta$ is measured according to H=1 and is irrespective of the harmonic order of the drive waveform. A low $\Delta$ is produced by connecting the first terminal of a winding to a first inverter phase, and the second terminal of the winding to the next inverter phase. For example, in a 9 phase machine, $\Delta$ may be 40, 80, 120 and 160 ED.

In some machines, such as the 36 slot, 18 phase machine of FIG. 3a, and other machines in which the slot count and phase count are both even, or otherwise have matched symmetry, evenly spaced inverter output phases will supply only every second winding with electrical current. A solution is to connect the windings of the first 9 odd numbered slots into a first mesh, and the windings of the first 9 even numbered slots into a second mesh. The inverter phases supplied to the second mesh are offset from the inverter phases supplied to the first mesh by 360/B*N, which in the present example results in 10 ED. In this way, balanced drive is provided to all of the windings. The value of $\Delta$ of the 18 phase machine is equal to the value of the $\Delta$ of the subset mesh connections. For example the above machine is connected with two 9 phase mesh connections, each having an $\Delta$ of 160 ED. $\Delta$ in the 18 phase machine is equal to the value of $\Delta$ of the subsets, i.e. 160 ED.

A benefit of the mesh connection arises when driving with a harmonic. The torque of a machine is commonly known to be related to the Volts/Hertz ratio. The Volts referred to here is not the supply voltage Vout, but the slot voltage. The slot voltage depends upon the voltage across the windings (Vw) of the machine, and may also be affected by other factors such as coil turn count, coil distribution, coil diameter, etc.

For a mesh connected machine, the voltage across each winding Vw is given by equation (ii). As may be noted, the voltage across mesh connected windings, Vw, depends upon both $\Delta$ and H, which may be varied during the design stage and machine operation. Therefore, the mesh connection allows for variation in torque output without requiring voltage or frequency to be sacrificed for one another.

To illustrate how Vw may vary with different values of H in a mesh connected machine, the machine of FIG. 3a is mesh connected with $\Delta$=160. Using equation (ii):
with H=1, $V_w$ is 1.97*Vout,
with H=3, $V_w$ is 1.73*Vout,
with H=5, $V_w$ is 1.29*Vout, and
with H=7, $V_w$ is 0.684*Vout.

Different values of H may be superimposed on one another and simultaneously used.

In theory, with H=2, Vw would be 0.684 Vout, the same as produced by H=7. H=2 is much preferred over H=7, because losses associated with increasing the pole count mean that H=7 is rarely suitable for normal operation.

However, if an attempt is made to drive the above machine with H=2, the machine will not function properly. In any machine, the odd numbered poles, counted rotationally round the stator, have the same polarity as one another. For example, the first and third pole are identical. Similarly, the even numbered poles have the same polarity as one another, such as the second and fourth pole. With H=2, the machine develops 4 poles, each with a pole area of 90 RD. Therefore, any two windings halves 180 RD apart should have the same ED, since with H=2, 180 RD represents two full poles. However, since the machine is full pitch, slots that are 180 RD apart, eg slots 1 and 19, are occupied by two halves of the same winding, and thus must operate with a 180 ED difference. Depending upon drive connection and configuration, these conflicting requirements might result in zero current flow, or might result in a magnetic short circuit in which considerable current flows, but no magnetic field is produced. Similarly, an attempt to drive with H=4, synthesizing an eight pole field, would be impossible with full pitch windings. In an eight pole field winding halves 180 RD apart also require the same ED, but because of the full pitch winding, they are bound to a 180 ED difference.

The coils of an AC machine are wound on the stator with a choice of full pitch or a short pitch. A full pitch winding is one in which the two halves of each winding are a full pole distance from one another on the stator. In a two pole motor, the windings are circumferentially spaced from each other by 180 RD on the stator, in a four pole motor, by 90 RD, etc. However, full pitch windings are not in general use, since the portion of the coil going from one side of each coil to the other, the end-turns, increases the resistance of the winding without contributing to the development of torque. The magnetomotive force produced by the stator winding in an ideal motor should be sinusoidally distributed. However, particularly for the three phase motor with full pitch windings, this is far from the case. One way of making the winding shorter and at the same time making the magnetomotive force more sinusoidal is by using short pitch windings, and by distributing the winding over several slots. When the coils of the winding are distributed over several slots, there is a reduction in the combined induced electromotive force. The individual coils of each winding will have a different spatial orientation due to the slots and there will be a phase difference between them.

Three winding factors are often defined: A distribution factor, a skew factor, and a pitch factor, also known as a chording factor.

The pitch factor may perhaps best be understood with reference to a two pole machine, in which RD and ED are the same. At full pitch, one half of a given coil would be positioned in the stator core diametrically opposite the other half, i.e. the halves of the coils would be angularly displaced 180 RD about the stator. With a chorded coil of less than full pitch, one half of the coil is displaced less than 180 RD from the other half, for example, 150 RD. The winding pitch may be measured in slots, eg 1:7, as a difference between slots, eg 6, in circumferential RD on the stator, eg 150 RD. Most commonly, the pitch factor is given by equation (iii).

Referring now to FIG. 3b, the schematic shows a distributed and short pitch winding in a prior art, three phase, two pole induction machine. The four coils constituting each winding half occupy three adjacent slots. This results in a more sinusoid distribution of the phase than within the 60 RD phase belt. Each coil it pitched over 5 slots, having a winding pitch of 160 RD, or a pitch factor, P, of 0.83. Note that some slots are shared by coil halves from different windings. The windings are each spread into three slots in a sequence half-full-half.

When short pitch windings are used, the efficiency of the winding is reduced. The two halves of the winding are situated on the stator less than a full pole apart. The result is that the slot current flow is somewhat out of phase with the rotating magnetic field.

A chording factor results from the fact that in a short pitch winding, two halves of different windings that are located in the same slot are not quite aligned with the correct current distribution. It is easiest to consider a lap winding, but the same effect generally holds for other winding types.

In a lap winding, each slot holds two winding halves from different windings. The net slot current depends upon the vector sum of the currents from each winding. In a short pitch winding, these two winding halves do not carry current that is in phase. So the net slot current is something less than the arithmetic sum of the two winding currents.

The 'Chording Factor', Kc, is given by equation (iv). For example, in a concentrated winding machine, in a certain slot are two coils, each carrying ten 10 amps, and having 10 turns. If the winding is full pitch and they are both in phase, the net slot current is 200 amps. If the winding is short pitch, the net slot current is reduced. For example, if the winding pitch is 90 RD in a two pole machine, under fundamental drive, P=0.67, and the coils will be 60 ED out of phase. The net slot current will only be 200*Kc=200*(sin(90*0.67))=200*0.87=174 amps. The shorter a winding pitch is from full pitch, the more a chording factor and the net slot current are reduced. In the same way, when the slot has to interact with the magnetic field, the voltages induced in the coils go down, again because interactions of different winding phases are being added.

Another way to think of the chording factor is that it is a multiplier to the number of actual series turns to determine the effective number of turns. In the above example, the 120 RD pitch windings have 10 full turns, but due to the short pitch, produce current and voltage as if they had 8.7 turns. However the length of the wire remains the same, so for resistance and resistance losses, the wire has its full 10 turns.

A benefit of chording is that the end conductors are shorter, reducing copper and resistance. In three phase machines, chording is often used to reduce harmonic flux produced by the coils. The pitch of the chorded coils is selected such that the pitch factor for the undesirable harmonics, such as the fifth and seventh harmonics is much less than that of the fundamental component.

To offset chording effects, a short pitch machine may be wound with an increased number of turns of thinner wire. Clearly the increase in the number of turns required, and the corresponding reduction in conductor cross section, is a detriment to machine efficiency.

The following table highlights a low speed, high torque operating regime and a high speed operating regime. The table further details trends associated with the slot voltage and current relative to the inverter output voltage and current.

In my previous disclosures, short pitch windings, distributed windings, and even order harmonic drives were identified as potentially useable, but not of particular benefit.

Figure 4:
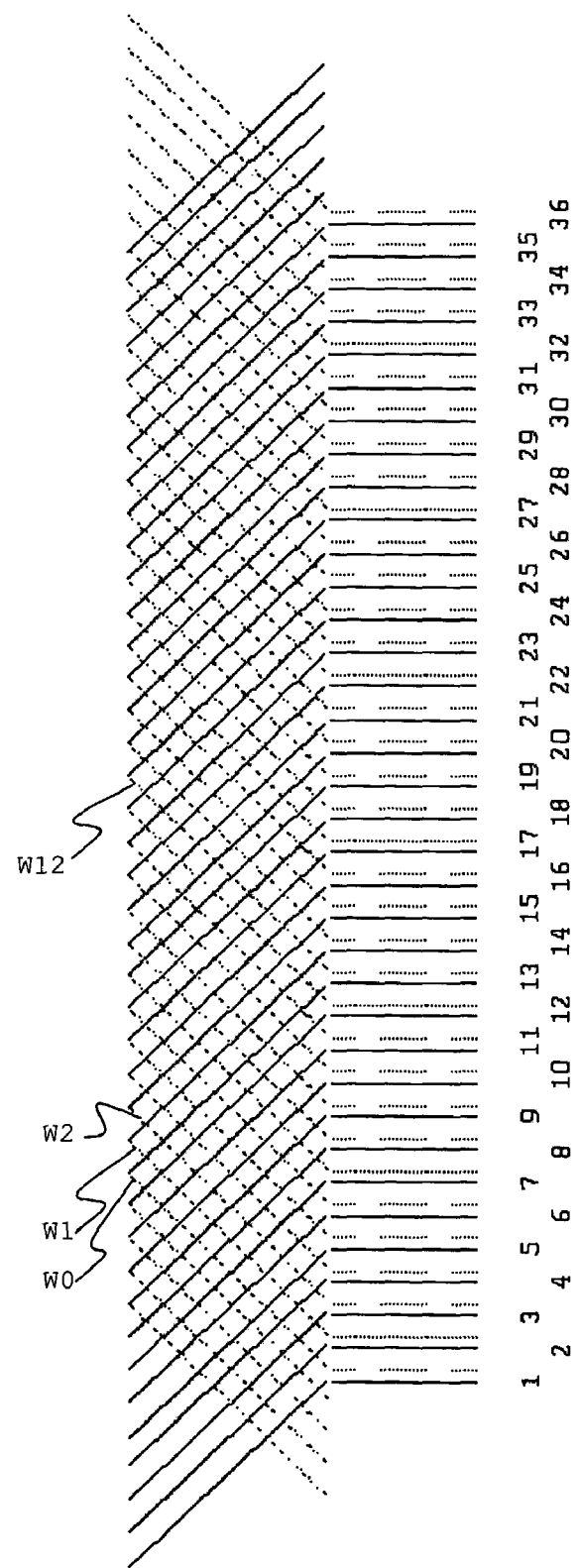
FIG. 4 is a winding schematic of a 36 slot, 36 phase machine with a short pitch winding.

Referring now to FIG. 4, a winding schematic is provided of a 36 slot, 36 phase machine with a short pitch winding according to the present invention. The present invention is not limited to any particular number of slots or phases, and the example is given for exemplary purposes only. Stator slots are numbered 1-36, representing the stator slots. The lines adjacent the slots each represent the winding in that slot. The 36 windings are numbered W0-W35, only a few of which are marked, for clarity. Each winding is a different driven phase. The bend in each winding on the diagram represents the stator end turn and renders each winding as two halves, a supply half and a back half. The back half always has a phase angle difference of 180 ED from the supply half. Each winding has a pitch of 1:13, which represents a short pitch winding and the base number of poles, B, is 2. The slots containing the supply half and the back half of each phase are 120 RD apart from one another on the stator. The windings are concentrated, meaning that each half winding is not distributed over more than one slot. An N phase power supply supplies N voltages and currents to provide each winding with an electrical phase.

In the present example, each slot contains two winding halves. For example, winding W0 goes through slot 1 and returns via an end turn in the reverse direction through slot 13. Similarly, winding W2 goes in one direction through slot 2 and in the reverse direction through slot 14. In slot 13 is one half of winding W12, the other half of which is located in slot 25. According to equation (i) for H=1: W0 in slot 1 is driven with 0 ED, the other half of W0, in slot 13, is driven with 180 ED, and W12 in slot 13 is driven with 120 ED.

This shows that the two winding halves in any slot are 60 ED out of phase from one another. They are enough in phase to produce a reasonably combined slot current at 150 ED. However, since the different winding halves occupying each slot are somewhat out of phase, the effective slot current is something less than the sum of the two half currents, resulting in higher voltage and lower current. The efficiency of magnetic field production is reduced, but remains acceptable. The degree to which the voltage/current ratio is increased is measured by the aforementioned chording factor, Kc, applied to the turn count of the winding. The Kc of a high phase order machine with variable harmonic drive may be determined according to equation (iv).

When a winding is full pitch, the Kc for all odd order harmonics is 1, and the Kc for all even order harmonics is 0. A harmonic order that produces a Kc of zero is unable to drive the machine. Therefore, only odd order harmonics can drive a full pitch wound machine. However, in any short pitch winding machine, each harmonic order may produce a different Kc, dependent on the actual winding pitch.

In the machine of FIG. 4, the pitch is 0.67 for H=1, 1.33 for H=2, 2 for H=3, 2.67 for H=4, and 3.33 for H=5. H=1, H=2, H=4 and H=5 all produce a Kc of 0.87, and are therefore able to drive the machine. However, in the same machine, H=3 has a Kc of 0, so is prohibited.

As mentioned with regard to FIG. 3b, in a mesh connected machine, Vw depends on the values of Δ and H. The V/Hertz ratio of the machine is dependent on Vw. It is also well known that the speed/torque output of the machine is dependent on the turn count, T, multiplied by the Kc. A novel feature of the present invention is that not only are even order harmonics allowed, but the short pitch high phase order machine also presents a variable Kc, dependent upon both the pitch factor P, and the harmonic order.

The lower the Kc is, the higher the machine speed/torque ratio. In a mesh connected machine, it is possible to identify different operating regimes, such as high torque operation, or high speed operation. Each regime may be assigned a different harmonic order, identified to produce a V/Hertz ratio most suited to the regime. Table 1 gives recommendations as to the speed/torque relation associated with different values of H, Δ and Kc. In addition, as mentioned above, certain values of Δ give the greatest range in Vw under operation with different harmonics.

For example, when Δ is close to 120 ED, a large range in V/Hertz is produced between H=1 and H=3, in which H=1 produces a low V/Hertz ratio, while H=3 produces a high V/Hertz ratio. Therefore, H=3 is suited to low speed, high torque operation, since it allows the maximum torque to be produced. H=1 would be suited to high speed operation since it allows maximum speed to be produced. Since H may be varied electronically, a variable percentage of each harmonic may be applied at once, superimposed upon one another. The operating regimes may have a great deal of overlap, and a V/Hertz ratio may be optimized for an application's need in real time.

The Kc is also dependent on H, and the winding pitch must be chosen at the design stage to have desirable characteristics with regard to the regimes in which each harmonic that is likely to be used.

In one embodiment, an application requires that a very high torque be produced at low speeds, and yet high speeds should not be compromised. At least two harmonics are identified, one to produce a low V/Hertz ratio and one to produce a high V/Hertz ratio. A winding pitch should be chosen that has a low Kc for the harmonic with a low V/Hertz ratio. This ensures that the top speed of the high speed operating regime will not be compromised. At the same time, the winding pitch should have a high Kc for the harmonic that produces a high V/Hertz ratio. The high Kc enables a low speed/torque ratio—and thus an effective torque boost—in the low speed, high torque operating regime. In the above example (in which B=2, and F is close to 120 ED, and H=1 is suited for high speed operation, and H=3 is suited for high torque operation), a very short pitch winding such as 60 RD will provide H=1 with a Kc of 0.5 and H=3 with a Kc of 1. The high speed/torque relation of H=1 is maintained, and the low speed/torque relation of H=3 is further decreased. If the identified harmonics were H=1 and H=2, the pitch would be chosen to be close but not equal to 90 RD.

However, other applications may have other requirements, and therefore each harmonic order should be matched with a Kc that meets the requirements of the application. For example, another application may require high torque at all speeds even at the expense of reaching top speeds. Therefore, a high Kc should be provided for each of the harmonic orders to be used.

Figure 5A:
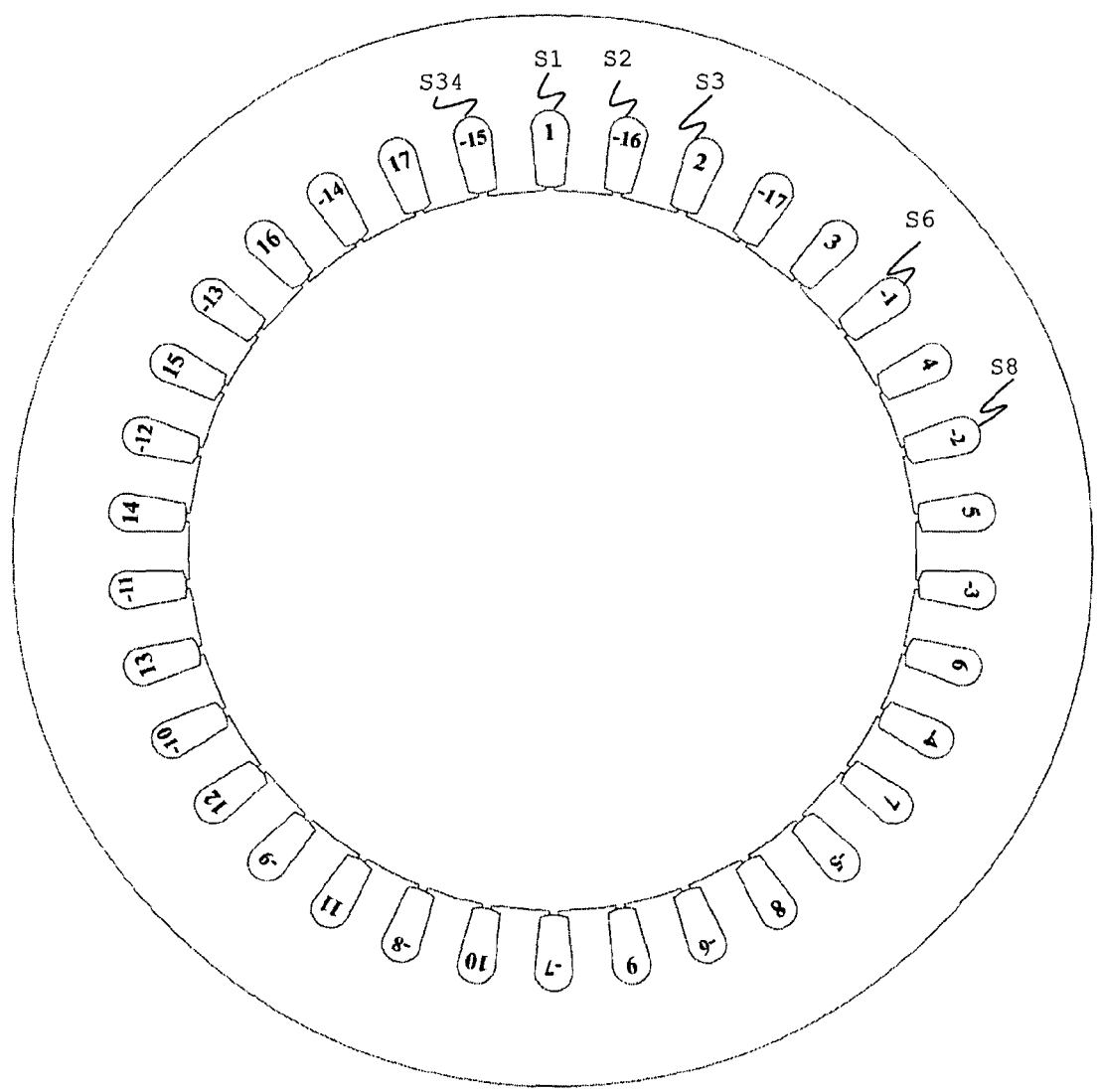
FIG. 5a is a schematic of a rotor for a 34 slot machine having 17 phases.

With reference now to FIG. 5a, a 34 slot machine is provided with 17 phases, and wound with B=2. 34 slots are provided, numbered S1-S34, of which only a sample are numbered, for clarity. The windings are numbered according to winding phase order. Winding 1 is located in slots S1 and S6, Winding 2 in slots S3 and S8. The winding pitch of 1:6 is equal to 52.94 RD, and P=0.29 for H=1. The back half of each winding is denoted by a minus sign. With H=1, 52.94 RD represents a very short pitch winding. Kc=0.45.

Using H=2, Kc=0.8
Using H=3, 6 magnetic poles are developed, each over 60 RD, and the 52.94 RD pitch is almost full pitch. The Kc is 0.98
For H=4, Kc=0.96
With H=6, the Kc 0.36.

Figure 6A:
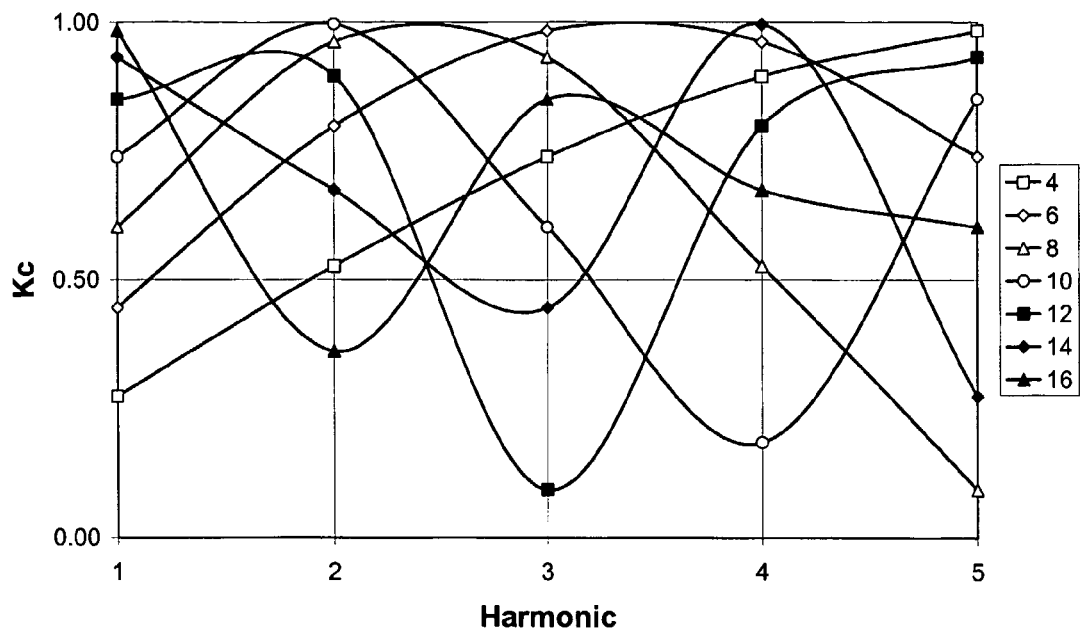
FIG. 6a is a graphical representation of the variation in the value for Kc with harmonic drive for a range of winding pitches from 1:4 through 1:16.

Clearly, not only does the value for Kc vary with the winding pitch used in the construction of the machine, it also varies according to the harmonic used to drive the alternating current machine. FIG. 6a is a graphical representation of the variation in the value for Kc with harmonic drive for a range of winding pitches from 1:4 through 1:16. For the winding pitches between 1:4 and 1:10, the Value of Kc increases to unity as the harmonic order is increased. More complex behavior is obtained at pitch numbers between 1:12 and 1:16. Thus an advantage of short pitched high phase order alternating current machines is that the chording factor may, Kc, may be varied by changing the harmonic drive. The variation shown here is independent of the spanning value of the alternating current machine.

With reference now to FIG. 5b, a combination circuit and physical diagram is shown. 17 inverter phases, V1-V17, are provided. Slots S1-S34 are numbered, and contain the 17 windings of FIG. 5a. Here the windings of FIG. 5a are driven in a mesh connection, in which L=6. Inverter phase V1 is connected to Winding 1 that has a supply-half in slot 1 and back-half in slot 6. Winding 1 is also connected to inverter phase V7. Similarly, Winding 2, has a supply-half in slot 3 and a back-half in slot 8 and is connected to inverter phases V2 and V8. These connections to the inverter provide a value of Δ across each winding of approximately 127 ED.

With H=1, Vw=1.79 Vout. This Vw represents a low V/Hz ratio, and is suitable for providing high speeds. As mentioned above, the Kc is 0.45, which can more than double the speed.

With H=2, Vw=1.60 Vout and as mentioned above, a Kc of 0.8. These effects may be suited for general operation.

With H=3, Vw=0.36 Vout. This harmonic produces a V/Hertz ratio suitable for reaching high torques. As mentioned above, the Kc is 0.98, which basically maintains the ratio of slot current/voltage produced by the turn count.

With reference now to FIG. 5c, the 34 slot machine of FIG. 5a, is configured with a different span mesh connection (L=8) to the one in FIG. 5b. The same winding pitch is maintained. A combination circuit and physical diagram is shown. 17 inverter phases, V1-V17, are provided. Slots S1-S34 are numbered, according to the windings 1-17 positioned within them. Inverter phase V1 drives Winding 1, located in slot 1 and slot 6. Winding 1 is also driven by inverter phase V9. Similarly, winding 2 has a half in slot 3 and another in slot 8 is connected to inverter phases V2 and V10. These connections provide an Δ of approximately 169 ED. This value of Δ provides a large difference in V/Hertz between H=1 and H=2.

With this setup, synthesis of H=1 provides a two pole field, with Vw of 2*sin((1*(169))/2)*Vout=1.99 Vout and, as mentioned above, a Kc of 0.45. The Vw is even higher and the Kc lower, than those produced by Δ=127, H=1 of FIG. 5b, and allow even higher speeds to be reached.

H=2 provides a four pole field, with Vw of 0.38 Vout and, as mentioned above, a Kc of 0.8. The low Vw enables very high torque to be reached at low speeds, slightly limited by the non-unitary Kc.

H=3 provides a six pole field, with Vw of 1.91 Vout and, as mentioned above, a Kc of 0.98. This drive may be useful for a medium high speed operating regime. The effect of the Kc on operation depends on the turn count.

Figure 6B:
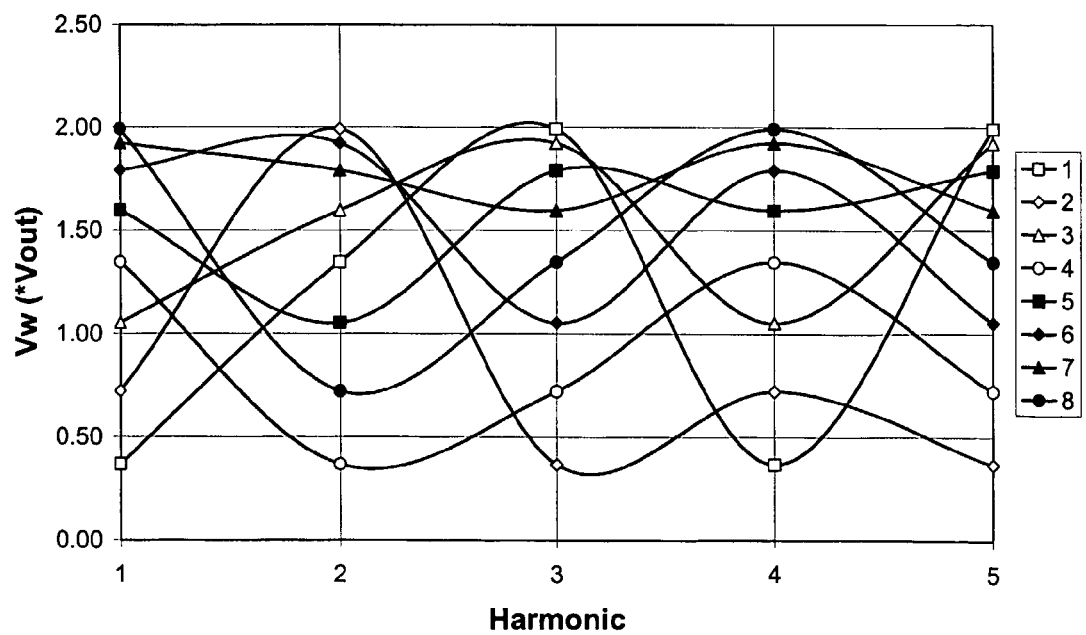
FIG. 6b is a graphical representation of the variation in Vw with harmonic drive for different values for L between 1 and 8.

FIG. 6b is a graphical representation of the variation in Vw with harmonic drive for different values for L between 1 and 8. For some spanning values, the change in Vw with harmonic drive is small (for example, for L=7); for others, very large changes in Vw are produced as the span value is changed. The changes shown here are independent of the winding pitch of the alternating current machine.

The Kc can work to maximize or mitigate the mesh effect, depending on application's requirement. In order to maximize the range of V/Hertz ratios in the machine with Δ=169, the pitch is made as close as possible to 90 RD, therefore producing a high Kc for H=2 and a relatively low Kc for H=1. Depending on the turn count, the range of V/Hertz ratios may be as great as 10:1.

As may be seen by FIGS. 5a-5c, a plurality of values of H can produce a wide range of Vw and Kc, and hence, V/Hertz ratios. A single machine may be able to achieve both low speed torque as well as high speeds. The embodiments are provided for exemplary purposes only, and should not be construed as limiting the machine to any particular combination of phases, slots, value of Δ, H, etc.

It should also be noted that the higher the harmonic order, the less powerful the harmonic is. This is because as the pole count increases, the pole area decreases. It is preferred therefore that a machine should be wound with a winding pitch with optimal Kc when operated with H=1 and H=2 and/or H=3. However, in some applications, there is also a great deal of value in higher order harmonics, since they produce different V/Hertz ratios.

The invention further defines a number of variables a user may select in order to optimize the range of V/Hertz ratios that a machine is capable of producing. For each application, a set of V/Hertz ratios required is determined. Values of N, Δ, H, P, turn count, and other factors are then selected to produce the required set of ratios. The machine is assumed to be mesh connected.

1) The number of different phases, N.

2) The value of Δ of the mesh connection. Δ may be mechanically variable. The values of Δ allowed are the integers up to N/2 multiplied by 360/N. The highest range in Vw between H=1 and H=2 is produced when Δ is close to but not equal to 180 ED. The highest range in Vw between H=1 and H=3 is produced when Δ is close to but not equal to 120 ED. The highest range in Vw between H=1 and H=5 is produced when Δ is close to but not equal to 144 ED. The highest range in Vw between H=1 and H=7 is produced when Δ is close to but not equal to 154 ED. These numbers are presented as a guide, and not to limit the invention in any way. Some applications require the widest possible range of V/Hertz ratios, while other applications require a large number of smaller incremental V/Hertz ratios.

3) The harmonic order of H. The order of H must be less than N for proper magnetic pole development. In addition, the lower H, the greater is the pole area it may develop, meaning that a lower order H is more powerful. The H is a factor in both the Vw and the Kc.

4) The winding pitch, P. The pitch must allow each desired harmonic to develop magnetic poles. The pitch provides a different Kc ratio per allowed harmonic. The turn count, T, must be multiplied by the Kc to produce the current to voltage ratio of the winding.

5) The slot count, size, and distribution, coil turn count, the wire diameter, the winding distribution factor, and various other factors are well known in the art in their effect on V. These effects are generally constant. These should also be selected to produce a required magnetization over the range of V/Hertz required per application. For example, in a machine in which the Kc for one of the harmonics is very low, the turn count may be increased and the wire diameter reduced, to compensate for the low Kc for that harmonic. The voltage produced by all of the harmonics will of course be decreased because of the increased turn count, and the current increased. In a further embodiment, the turn count may be usual and with regular thickness, with no compensation for the low Kc of one of the harmonics at all. The machine may then be capable of operating with a very high speed/torque relation. In a further embodiment, the turn count may even be reduced below normal, allowing thicker wire or other conductors, to further decrease the slot current, since in the same machine, a different harmonic can provide a high V/Hertz ratio and relatively high torque. Turn counts and winding thickness are well known in the art, and are not described further here as they and their effects on current and voltage are well known. These factors may be varied for other reasons too, such as ease of winding, etc.

In a star connected machine, H affects the pole count and pole area and the Kc. Therefore, a small range in V/Hertz ratios may be produced by using a short pitch star connected machine and varying H. For example, a machine may be wound with a short pitch for H=1 and an almost full pitch for H=2, eg 100 RD pitch. When the machine is driven with H=1, the low Kc makes high speeds attainable. The machine may be wound with extra turns of winding, so that when the machine is driven with H=2, a high torque at low speeds is available.

The motor and drive components of the present invention are well known in the art. For example, PWM generation is well known in the art. PWM may alternatively be provided by custom programmed logic hardware, using direct digital synthesis of the PWM waveform. Under custom designed program control, arbitrary synthesis of different waveshapes, mixtures of values of H, frequencies, and amplitudes are possible. Feedback control of rotor speed or other parameters permits accurate torque/speed curves to be generated.

Standard winding techniques may be used and any type of wiring or conductors may form each winding phase, for example conventional inverter spike resistant wire. The value of Δ of the mesh connection may be fixed, or alternately, all winding terminations may be brought out, permitting easy selection of different mesh connections.

A lap winding has been discussed; however, other types of winding may also be used with the present invention. For example, a wave winding may be used to produce the short pitch winding. With B=4, while a lap winding would contain two separately formed coils for each winding phase, a wave winding is one continuous winding looping through all four slots in turn. Using a wave winding, it may be noted that the end turns on one end of the stator are substantially longer than at the other end of the stator, due to the short pitch. It is therefore recommended that every second winding be wound in a reverse direction, to even out the end turns.

The windings may be concentrated or distributed.

The pitch of the winding must have a reasonably efficient Kc for each harmonics that are chosen to drive the machine. Even a very low Kc such as 0.1 may drive the machine, but associated losses will make this undesirable. For each machine a minimum reasonable Kc must be determined for all the useful harmonics.

However, as has been noted, the longer the winding pitch in RD, the more losses there are, resulting from long end turns to each winding. This is another way in which the present invention is an improvement since a high Kc may be produced by some harmonics and yet the pitch may be RD may be low, resulting in fewer end turn losses.

Further combinations of coils, windings and pitches are also envisioned. There may be an equal number of winding phases to slots, or there may be more phases than slots, or more slots than phases. For example, a 36 slot machine may be wound with 36 winding phases, so that each slot contains the supply half of one winding and the back half of a second winding. Alternatively, the 36 slot machine may be wound with 18 windings, as described above.

The requirements of each application must be determined in advance so that a system may be designed to meet the requirements. Some applications require a maximal speed range, others a maximal torque range, and still others require combinations of the two. It is worth noting that H is variable, Δ may be variable, and the Kc must be fixed at the design stage. Therefore, in order to design a high phase order machine with a particular range of speed/torque relations, one must select the values of N, Δ, H, P and T that produce the required range. If only a particular constant speed/torque relation is required, then the machine should preferably be optimized for that to be produced with H=1, which is the most efficient harmonic. If a wider range of speed/torque relations is required, H and Δ are the only two variables that may be varied during operation. It should be noted that harmonics may be used in isolation or as a combination of more than one harmonics. The other variables should be optimized at the design stage for the most useful values of H and/or Δ. The machine is wound with the selected values of N, P and T. A value of Δ is selected with which the windings are electrically connected to the inverter. The machine is driven with one of the selected values of H. During operation, a change in speed/torque relation is produced by mechanically varying Δ and/or electrically varying the value of H or superimposing various values of H.

A winding that contains a plurality of coils may have different coils of different pitch, for example each winding has a first coil 1:6 and a second coil 1:7.

The machine may be wound with any pole count. For example, with B=4, each winding may have two separate supply halves and two separate back halves on the stator, providing a four pole field with H=1.

INDUSTRIAL APPLICABILITY

While this invention has been described with reference to numerous embodiments, these are not to be construed as limiting the scope of the invention.

While this invention has been described with reference to numerous embodiments, it is to be understood that this description is not intended to be construed in a limiting sense. Various modifications and combinations of the illustrative embodiments will be apparent to persons skilled in the art upon reference to this description. It is to be further understood, therefore, that changes or modifications in the details of the embodiments of the present invention and additional embodiments of the present invention will be apparent to, and may be made by, persons of ordinary skill in the art having reference to this description. It is contemplated that all such changes and additional embodiments are within the spirit and true scope of the invention as claimed below.

The invention claimed is:

1. A high phase order alternating current rotating machine having an inverter drive providing more than three phases of drive waveform of harmonic order H, in which windings of said machine have a pitch of less than 180 rotational degrees (RD), said windings are connected in a mesh connection, said mesh characterized in that:
each winding phase is electrically connected to:
i. a first inverter terminal, and
ii. a second inverter terminal L terminals distant from said first inverter terminal in order of electrical phase angle, where L is the span number and represents the span number between the terminals connected across each winding phase;
and the phase angle difference between the two inverter terminals to which each winding phase is connected is identical for each winding phase.

2. The machine of claim 1 in which H is 1.
3. The machine of claim 1 in which H is >1.
4. The machine of claim 1 in which said windings are connected in a delta connection.
5. The machine of claim 1 in which said windings are connected in a star connection.

6. The machine of claim 5 wherein said inverter provides a drive waveform comprising a selectable degree of H=1 and another harmonic closest to 180/(Pitch in RD).
7. The machine of claim 1 having a high speed/torque output when said inverter provides a drive waveform having a first value for H, and having a low speed/torque output when said inverter provides a drive waveform having a second value for H.
8. The machine of claim 1 having a high value for chording factor (Kc) when said inverter provides a drive waveform having a first value for H, and having a low value for Kc when said inverter provides a drive waveform having a second value for H.
9. The machine of claim 1 wherein said windings are lap wound.
10. The machine of claim 1 wherein said windings are wave wound.
11. The machine of claim 1 wherein said windings are distributed.
12. The machine of claim 1 wherein said windings are concentrated.
13. The machine of claim 1 wherein the machine is a motor.
14. The machine of claim 1 wherein the machine is a generator.
15. The machine of claim 1 wherein the machine is an induction machine.
16. The machine of claim 1 wherein the machine is a synchronous machine.
17. The machine of claim 1 wherein the machine is a brushless DC machine.
18. A high phase order induction machine drive system comprising
   a. an inverter system for the synthesis of N phases of alternating current output, where N is greater than 3
   b. an induction motor comprising N phase windings, wherein a subset or all of said windings have a pitch less than 180 RD,
   and wherein said alternating current output selectively comprises an even order harmonic, and said machine is mesh connected, said mesh characterized in that:
   each winding phase is electrically connected to:
   i. a first inverter terminal, and
   ii. a second inverter terminal L terminals distant from said first inverter terminal in order of electrical phase angle, where L is the span number and represents the span number between the terminals connected across each winding phase;
   and the phase angle difference between the two inverter terminals to which each winding phase is connected is identical for each winding phase.
19. The high phase order induction machine drive system of claim 18 wherein said machine is star connected to the inverter output phases.
20. The high phase order induction machine drive system of claim 18 wherein said winding pitch is close to a pitch selected from the group consisting of: 30 RD, 36 RD, 45 RD, 60 RD, 90 RD, and 120 RD.
21. The high phase order induction machine drive system of claim 20 wherein a drive waveform comprises a selectable degree of H=1 or H=3 and a harmonic of an order close to 180 degrees divided by the pitch in rotational degrees.
22. The high phase order induction machine drive system of claim 18 wherein L is variable.
23. A method for operating a high phase order machine comprising
   a. electrically connecting N windings to N inverter drive terminals, where N is greater than 3,
   b. winding the N windings with a winding pitch that substantially allows both H=1 and H=2 to develop magnetic poles c. determining the torque/speed relation produced by drive waveforms comprising H=1 and H=2,
d. controlling the machine speed/torque relation by synthesizing for said inverter drive terminals a drive waveform comprising a selectable degree of H=1 and H=2, wherein the step of connecting N windings to N inverter drive terminals comprises electrically connecting each winding phase to:
i. a first inverter terminal, and
ii. a second inverter terminal L terminals distant from said first inverter terminal in order of electrical phase angle, where L is the span number and represents the span number between the terminals connected across each winding phase;
so that the phase angle difference between the two inverter terminals to which each winding phase is connected is identical for each winding phase.

24. The method of claim 23 wherein said N windings are connected to said N inverter terminals with a mesh connection.

25. The method of claim 23 wherein said N windings are connected to said N inverter terminals with a star connection.

26. A method for producing a required range of speed/torque relations in a high phase order mesh connected machine, said mesh characterized in that:
each winding phase is electrically connected to:
i. a first inverter terminal, and
ii. a second inverter terminal L terminals distant from said first inverter terminal in order of electrical phase angle, where L is the span number and represents the span number between the terminals connected across each winding phase;
and the phase angle difference between the two inverter terminals to which each winding phase is connected is identical for each winding phase, the method comprising,
a. selecting values for the following variables to provide the required range of speed/torque relation, wherein said variables comprising:
i. the number of phases,
ii. the phase angle difference of the mesh connection,
iii. the pitch of the windings
iv. the winding turn count
v. the harmonic order,
wherein one or both of the phase angle difference of the mesh connection, and the harmonic order comprise two or more values, and
b. winding the machine with the selected number of phases, pitch and turn count, and
c. electrically connecting the machine with one of the selected mesh phase angle difference values, and
d. driving the machine with one of the selected harmonic order values, and
e. varying the selected values of mesh phase angle difference and/or harmonic order to produce the required range of speed/torque relations.

\* \* \* \* \*